Nov. 27, 1934.   A. F. SHORE   1,982,026
APPARATUS FOR MEASURING THE HARDNESS OF MATERIALS
Original Filed April 9, 1927   2 Sheets-Sheet 1
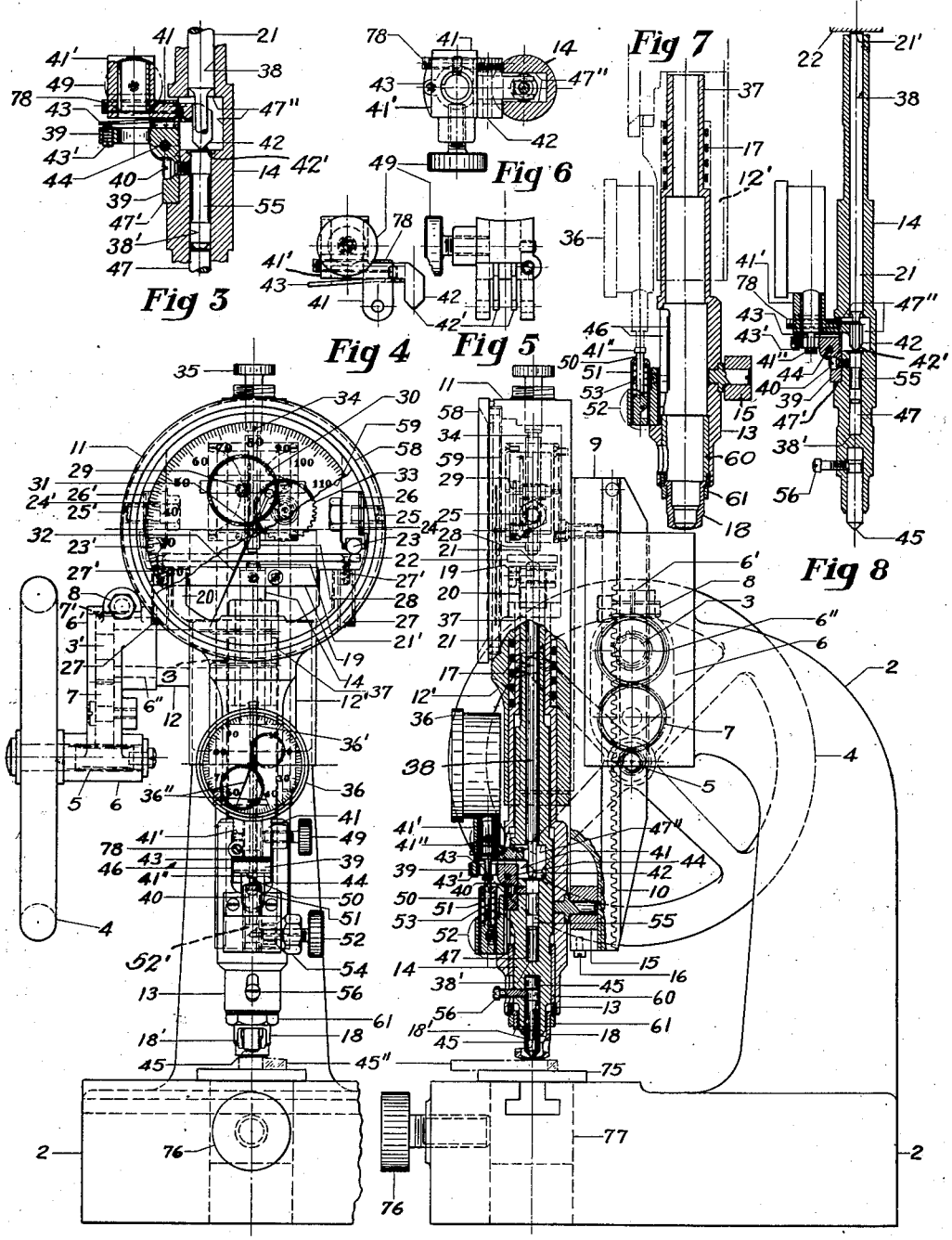
INVENTOR
Albert F. Shore
BY
ATTORNEY Nov. 27, 1934.    A. F. SHORE    1,982,026
APPARATUS FOR MEASURING THE HARDNESS OF MATERIALS
Original Filed April 9, 1927    2 Sheets-Sheet 2
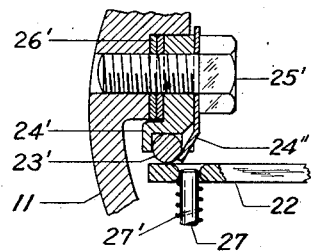
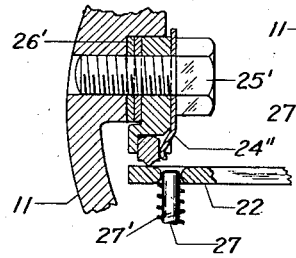
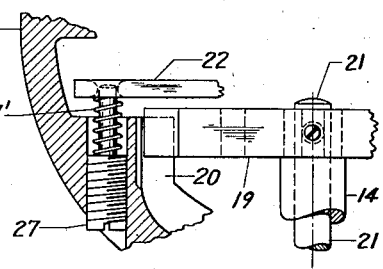
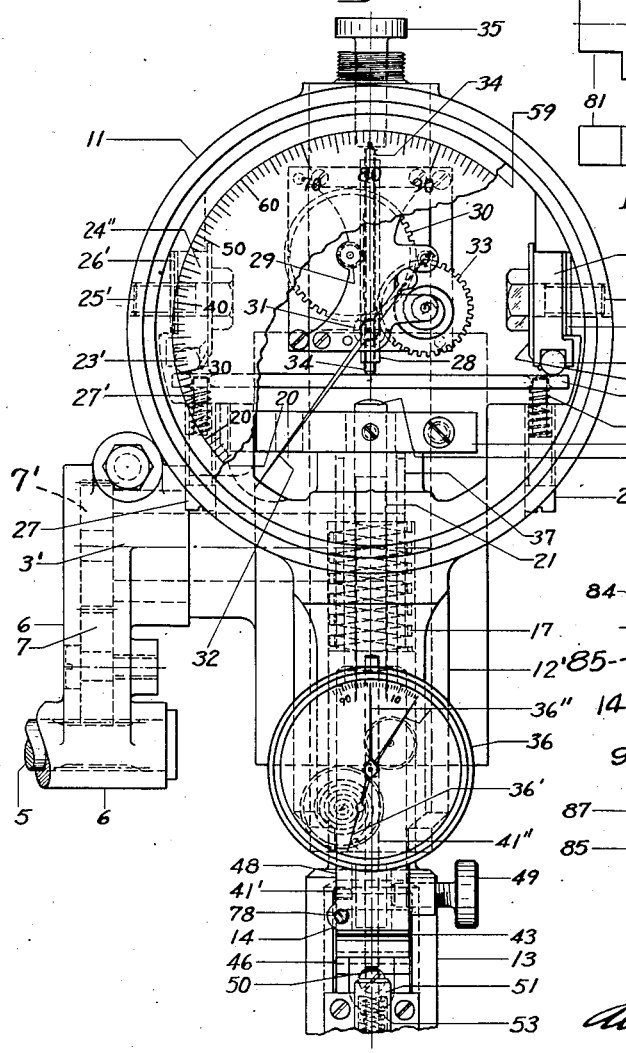
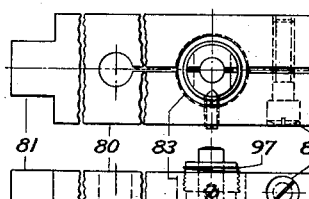
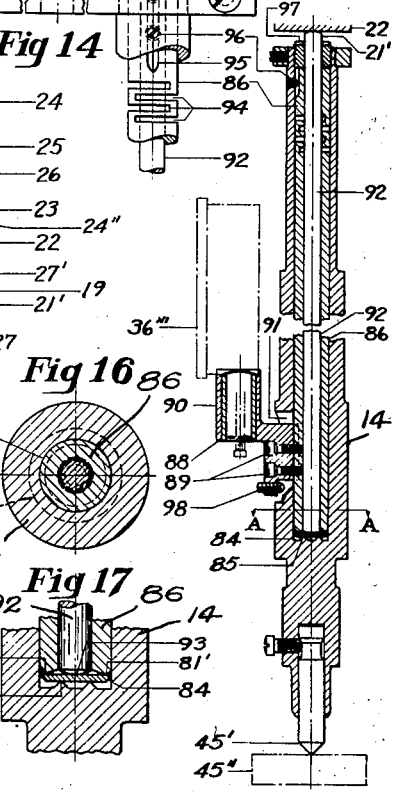
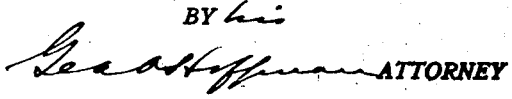

Patented Nov. 27, 1934

1,982,026

UNITED STATES PATENT OFFICE 1,982,026

APPARATUS FOR MEASURING THE HARDNESS OF MATERIALS

Albert F. Shore, New York, N. Y.

Continuation of application Serial No. 182,243, April 9, 1927. This application March 24, 1930, Serial No. 438,622

6 Claims. (Cl. 265—12)

This invention relates to improvements in apparatus for measuring the hardness of materials and simultaneously and automatically indicating or registering the same, the application being a continuation of my application Serial No. 182,243, filed April 9, 1927.

One object of the invention is to provide means for surface contacting the test specimen and holding the latter rigidly in place while a test is being made.

Another object is to provide pressure means and for ascertaining and simultaneously and automatically indicating and registering variable or predetermined constant pressure.

Another object is to provide means for ascertaining and simultaneously and automatically indicating and registering a predetermined constant or variable depth of indentation in the specimen under test.

Another object is to provide compensating means for neutralizing or nullifying the compression or contraction of the superhard-impresserpoint forming part of the depth measuring means, while a test is being made.

Another object is to provide for the micrometer-gages, forming part of the device, when desirable, a plurality of indicator members, to avoid the necessity of returning the same to zero at the commencement of each testing operation.

Another object is to provide convenient driving means for furnishing the necessary pressure to successfully operate and control the measuring apparatus while conducting a hardness test.

The foregoing and other objects of the invention will be hereinafter fully described and claimed and are illustrated in the accompanying drawings, in which Figure 1 is a front elevation of an embodiment of my invention in which a portion of the dial of the pressure gauge scale is broken away to show the interior mechanism and showing the parts in position to make a hardness test.

Figure 2 is a side elevation in which there is shown in cross-section the lower portion of the measuring assembly of the machine, including among other features, an elongated bearing-sleeve with a pressure-spring, a primary pressure-bar and an auxiliary pressure-bar and a contractile compensator element, and other parts terminating in the superhard-impresser-stem;

Figure 3 is an enlarged cross-section of a portion of the primary pressure-bar, illustrating the general arrangement of an auxiliary pressure-bar and a contractile element, also an off-set arm or tilting compensator-lever with a micrometer-holding bracket in connection therewith;

Fig. 4 is a side elevation of the compensator-lever mentioned,

Fig. 5 is a rear elevation while

Fig. 6 is a top view of said lever;

Fig. 7 is an elevation in cross-section of the elongated tubular member or sleeve with its clamping-pressure spring, but with the pressure-bar unit removed, and showing in dot and dash lines the position of a boss of the pressure gauge casing in which the sleeve is movably mounted and of a micrometer gage;

Fig. 8 is a view in cross-section of the pressure-bar unit with the tubular member or sleeve removed;

Fig. 9 is a front elevation on an enlarged scale of the upper portion and of the measuring assembly of the machine shown in Figure 1, but showing the parts in normal inoperative position.

Fig. 10 is an enlarged cross-section of one of the mountings for the pressure-measuring spring unit;

Fig. 11 is a view similar to Fig. 10, but showing the bearing for the spring as provided with a knife-edge;

Fig. 12 is a cross-sectional view showing the primary pressure bar provided with a key-arm for guiding and preventing the bar from turning in its vertical movements;

Fig. 13 is an elevation in cross-section of a modified arrangement of the pressure-bar unit shown in Fig. 8.

Figure 14 is an elevational view of the upper part of the pressure bar shown in Figure 3.

Fig. 15 is a view looking at the top of Figure 14.

Fig. 16 is a sectional view taken on line A—A of Fig. 13; and

Fig. 17 is a side elevation in cross-section, showing the construction of an elastic disc-lever compensating means.

In the embodiment of the invention illustrated the operative parts are carried by the frame or support 2. A stud shaft 3' rotatably mounted in a frame has a pinion 3 fixed thereon. The shaft is actuated by a hand wheel 4, or the equivalent, rotatably mounted in a swinging adjustable bracket or gear case 6 which has a split hub 6', whereby it is mounted on a reduced part 6'' of a boss 12 of the frame 2 to have angular adjustment and locked by a clamping screw 8 in any desired angularly adjusted position relative to the pinion 3, depending on the size of the specimen of the material for which the machine is set within its rated vertical or gap capacity. A pinion 5 on the shaft in the gear case meshes with an intermediate gear 7, which meshes with a gear 7' on shaft 3'. A dove-tail slide-bar 9 provided with gear or rack-teeth 10 is mounted in a correspondingly formed slideway in the end of an arm of the frame overhanging the frame base. The pressure-indicating mechanism or gage is housed in a casing 11, having a tubular boss-like appendage or neck 12' at its lower end to receive, preferably slidably, a specimen-clamping and depth measuring sleeve 13, into which there is fitted, preferably slidably a longitudinally movable idler pressure-bar 14. 15 is a key-block for the sleeve 13, which key-block moves in a keyway in the dove-tail slide-bar 9, to prevent said sleeve from turning. The key-block 15 is held in a predetermined position by a vertically adjustable stop in the form of a screw 16, which stop also controls the position of the superhard-impresser-point 45, relative to the bottom of the terminating contactor-cap 18. 17 is a spring for applying downward pressure on the sleeve 13 for clamping down the test specimen and holding it in position through the removable preferably screw-threaded cap 18, before mentioned, at the lower end of the sleeve 13. 19 is a key-arm for the upper end of the pressure-bar 14, sliding in a key-way 20, to prevent the pressure bar from turning. 21 is the rounded upper end of the auxiliary pressure-bar for contacting during the testing operation with pressure responsive means in the form of the leaf or elongated plate-spring 22, which spring bears against hardened bearing members shown in Figures 1, 2, 9 and 10 as comprising rollers 23, 23', held in grooves of adjustable blocks 24, 24' mounted by set-screws 25, 25' on the indicator casing 11 with interposed removable shims 26, 26', the rollers being held against the bottom or upper surfaces of the grooves in the blocks 24, 24', by light springs, preferably leaf-springs 24'', whereby, when the elongated plate-spring 22 is flexed under pressure, the rollers 23 and 23' will be effectively held in the proper position for responsive action. If desired the bearing members 23, 23' may be provided with knife edges, as shown in Figure 11, to contact with the plate spring 22. It is understood that the plate or leaf-spring 22 may be shortened or lengthened, and consequently its power increased or decreased, for the purpose of standardization and checking up with standard weights by adding to or removing one or more of the shim pieces 26, 26' from and between the clamping side of the blocks 24, 24' and the inner wall of the casing 11. Screws 27 having a reduced stem fit loosely into holes in the plate-spring 22, springs 27' being coiled around said reduced stems, for holding the plate-spring 22 in a central position in the casing 11 and also for keeping the plate-spring in a pressure contact with the bearing members 23, 23' to eliminate lash errors and to promote complete responsiveness. A small slidable rack-bar 28 meshes with a pinion 29, fastened to a gear 30, meshing with and actuating pinion 31, carrying pointer hand 32. An auxiliary gear 33, carrying a hair-spring on its axle, which gear also meshes with pinion 31, serving to keep the rack-bar 28 always in responsive contact with the plate-spring 22 and also in relation to pointer 32. Said rack-bar 28 is hollow and has threaded therein a stem 34, provided with a tongue or the like at its upper end for engagement in a recess in an axially movable key 35 for the purpose of setting the pressure-indicator mechanism in the casing 11 to zero. This key is normally urged to position out of engagement with the stem 34 by a spring (not shown) arranged in the key mounting in the casing 11. The contacting end 21' of the pressure bar 14 is also normally out of engagement with the leaf or plate spring 22, as shown in Figure 9, to permit setting a depth indicating micrometer-gage 36, carried by the pressure communicating bar 14; that is to say, the pressure-bar 14, together with the gage, etc., rests upon the test specimen 45'' only by its own weight, which is constant, so as to avoid undue initial deformation or penetration of the test specimen, particularly in the softer metals. The "idler" pressure-bar 14, somewhat reduced upon the upper portion thereof, is adapted to bear for longitudinal motion at 37 in the upper part of the also reduced sleeve 13. This portion of the pressure bar is provided with a bore 38, terminating near the socket of the inserted impresser-stem at 38', (see Figs. 2 and 8). In the bottom of the bore is inserted a hardened steel anvil-plug 47. Resting on the anvil-plug is a contractile compensator-pin 55, best shown in the cross-section assemblies of Figs. 3 and 8, also in Fig. 2. Resting on top of the compensator pin, which is slidably free, is the end of the auxiliary pressure-rod 21, which directly contacts at 21' also with the plate-spring 22 during the test operation. Bearing members 42, (Figures 3, 4, 5 and 8) have knife edges 42' which also rest on the contractile pin 55 at opposite sides of the pressure bar 21. These knife edge bearing members are carried at one end of an arm 41 of a compensator lever, which is pivotally mounted by a pin 44 on a bracket 39 fastened to the primary pressure-bar 14 by a screw 40. The knife-edge of this lever is held in contact with the top of the contractile-pin 55 through the medium of an adjustable spring 43 fastened on to said lever, the adjustability of the spring being obtained through a screw 43' threaded in a laterally extending portion of bracket 39. Lever 41 is provided with a boss 41' for holding a lineal micrometer 36, through the medium of a set-screw 49. It will thus be noted that when pressure is applied to the reach-rod or auxiliary pressure-bar 21 to the impresser-point 45, best shown in Fig. 8, the compensator-pin 55, being of somewhat reduced diameter, shortens or contracts under increasing pressure. The knife edges 42 of the micrometer-carrying lever 41 being held in close contact with pin 55 by spring 43 which will follow up this microscopic motion, with the result that the outer end terminating in boss 41' is tilted upwardly a corresponding distance, which is designed to be equal to the contraction or shortening of the penetrator or impresser-point 45. The pressure-bar assembly is thus an independent correcting unit, which, however, does not become effective until it is mounted in the sleeve 13, or its equivalent, best shown in Fig. 7. By this movement of the lever the micrometer is moved away from a manually adjustable micrometer actuating stem 50, which is mounted on the sleeve 13, which stem becomes effective to operate the micrometer, for the reason that its carrying sleeve rests relatively immovable on top of the test specimen, whereas the pressure-bar carrying the micrometer approaches the test specimen in the act of penetrating it, thus actuating the micrometer it carries through the medium of its slidable stem 41''. The result of this arrangement is that for each unit the impresser-point 45 shortens (and which would be falsely registered as a penetrational depth unit by the micrometer), the said micrometer is withdrawn a similar unit from its actuating stem 50 to offset the error. By thus automatically controlling the relative position of the depth-micrometer, only the actual depth penetrated by the impresser-point 45 even in the hardest test specimens is faithfully indicated. The measurement of depth then becomes a dependable constant, leaving the resulting pressure variable for diverse hardnesses, as the quantitative expression of this property; namely, the hardness number. By securing the micrometer-carrying lever 41 out of contact with the contractile-pin 55, as by the screw 78, for which purpose it is intended, the machine as a whole would still be operative but only as a comparator, the pressure bar acting as a one piece element; that is, no definite constant would exist, but comparative hardness values could be obtained of a lower value, and then the depth-micrometer would give only an approximate check on the relative depth penetrated.

The type of micrometer-gage preferred is the one in which a slidable actuating stem 41″ protrudes from a hollow sleeve forming part of the micrometer casing, and the stem provided with rackteeth for actuating a gear-train within the micrometer casing and which train is opposed by an auxiliary gear carrying an opposer hair-spring on its spindle (not shown in detail). An important feature of this micrometer is that it carries both a single and a twin-pointer hand. The single pointer-hand is used for the purpose of setting the micrometer-gage to zero, whereas the twin-pointer hands are for the purpose of spacing off a fixed number of divisions by visual means only, and which obviates the necessity of setting the micrometer-gage to zero. To permit assembling, also in the operation of the device thereafter, slot perforations are made in the tubular member or sleeve 13 on the front thereof, as at 46. After inserting the pressure-bar 14 in the sleeve 13, the bracket 39, to which the micrometer-lever 41 has originally been pivoted, is then inserted and fastened to the pressure-bar by the screw 40. To accommodate said bracket and the actuation of the lever, an opening or slot is cut into the front of the primary pressure-bar, as indicated at 47′ and 47″. The stem of the micrometer is then inserted in the boss 41′ and clamped therein by the set screw 49. The micrometer actuating stem 50 is adustably carried by a cap member 51 secured to the sleeve 13. The micrometer actuating stem 50 is actuated to effect adjustment of the micrometer by a screw 52 having a conical end engaging an inclined surface at the end of the steam 50, as shown at 52′. By screwing the screw 52 inward or outward longitudinal movement is imparted to the micrometer actuating stem. A spring 53 within said cap 51 urges the stem 50 into contact with the micrometer actuator screw 52 for responsive action. A hollow threaded nut-screw 54 is provided for taking up wear on and locking the screw 52 in adjusted position. The impresser stem 45 is held against the seat in the socket in the pressure bar 14 by a screw 56. It will be noted that the micrometer carrying bracket and lever 39, 41 move freely longitudinally in the slot 46 in the sleeve 13, which sleeve is movable longitudinally in the extension boss of the casing neck 12′. A removable split ring 58 engages a suitable shoulder groove on the inside of the indicator casing 11 to hold a glass cover for the graduated dial 59 in the casing. The cap member 18 normally bears against the bushing or sleeve bearing 60 engaged upon the lower part of the pressure bar 14 and engaging in an enlargement of the lower end of the sleeve 13, and the cap is clamped in any desired radial position to said bushing by a ring nut 61.

As shown in Figs. 1 and 2, a work or specimen support 75 is mounted in a socket 77 in and superimposed to the machine bed 2, and secured therein by a set-screw 76.

In Figure 13 there is shown an alternative construction of the compensating pressure bar illustrated in Figs. 1, 2, 3 and 8. This pressure-bar, with the exception of a slight modification thereof, is substantially interchangeable with the bearing-sleeve unit 13, illustrated in front elevation in Figures 1, 2 and 7. This pressure-bar, like the above-mentioned, is provided on the top with a removable cross-arm 80, a side front view of which is shown in Fig. 14 and a top view in Fig. 15. This cross-arm is provided with a key 81 and a clamping screw 82 with a bore 83 for receiving the upper end of the sensitive, modified pressure-bar. Instead of using a hinged lever 41 and a contractile pin 55 for correcting and offsetting contraction errors in the impresser-stem 45, in this instance a small disc or diaphragm-spring 84 is used, which is adapted to bear and to span across knife-edges 85, preferably formed at the bottom of a bore inside of the primary pressure-bar, Fig. 13, and shown in detail in Figures 16 and 17, with top view of Fig. 16. Resting on the upper surface of disc 84 is a tubular member 86, provided also with knife-edges 87. Mounted on a side of the tubular member 86 is a bracket 88 fastened by set-screws 89. This bracket carries the depth-measuring micrometer 36‴, fastened in a boss 90 of the bracket, the same as in the other assemblies hereinbefore described. Accessibility to the tubular member 86 is provided by a clearance slot 91 in the pressure-bar, (see Fig. 13). Inside of the tubular member 86 is the sensitive auxiliary pressure bar 92, provided with a rounded tip at the top for engaging the resistor or weigher-spring 22, as hereinbefore described. The bottom end is of slightly convex formation 93 for contacting in the center of the disc-spring 84. The tubular member 86 is provided with a zig-zag or slitted elastic formation 94 extending longitudinally thereof and has a key-groove formation 95 therein for engagement of a set-screw 96 acting as a key to hold the tubular member against radial motion. A screw-nut 97 bears on the top of the member 86, for the purpose of providing adjustable pressure which is transmitted to the top of disc 84. This pressure does not only hold the disc 84 against the knife-edges 85 but also against the knife edges of the member 86 carrying the micrometer-gage 36″ against the top of the disc, for the purpose of responsive action when pressure is applied to the inner auxiliary reach-rod 92. The effect of this, then, is to depress the central part of the disc 84 and a corresponding tilting-up action of the peripheral edges thereof. In one sense, the disc 84 becomes a lever, answering the same purpose as the lever 41 in the assemblies previously described. Its action, however, is double; that is, when the parts overhanging the circular knife-edges 85 toward the center elastically move downward, the two opposite parts or ends move upward. This action is, of course, microscopic. However, it is sufficient to definitely raise the tubular member 86 and the micrometer that it carries to offset a similar amount of contraction in the impresser-point 45' when subjected to pressure against the test specimen 45''. Considered in another sense, the pressure-bar unit 14, (see Fig. 13), when subjected to pressure, when making hardness tests, shortens inevitably at the point of the impresser according to its modulus of elasticity per unit area. In other words, its molecular structure undergoes a distorting strain, whereas, at the top, contraction occurs mechanically and, accordingly, this movement serves to actuate the micrometer in the opposite direction through the medium of the lever means, as described.

The operation of the machine is as follows:

Pressure is applied preferably to the movable pressure-gage or weigher-head 11 and its associated parts, to be communicated eventually as stressing-pressure to the specimen under test. This is accomplished through the medium of the hand-wheel 4, or its equivalent, pinion 3 and rack 10, and then communicated to the slide-bar 9 and the casing or housing 11, which, with its appendage or boss 12', carries, moving freely therein, a depth-measuring assembly, and, although this is adapted to press against the test-pressure-measurer or plate-spring 22 during the operation of hardness testing, it is also an idler member; that is, it is normally out of contact with the spring 22 (see Fig. 9). Hence, means are provided for effecting a fixed or predetermined, light preliminary contact with the test specimen. When the pressure-measuring unit 11 is moved toward the test specimen in the manner as set forth, the cap 18 first contacts with and also serves to clamp the test specimen 45'' against the anvil-plate 75, under pressure of spring 17. As the pressure-head 11 advances further, it will move the indicator-hand 36' on the depth gage 36, until the impresser-stem 45 makes a light preliminary or zero setting contact with the test specimen. It then comes to rest preparatory to setting the said depth-gage hand 36' to zero, (when this is desired) through the medium of the thumb-screw 52. Before the impresser-stem point actually contacts with the test specimen, however, the portion to be tested may be observed and located through suitable openings 18' in the cap. Having thus set the indicator-hand of the depth-gage 36 to zero under the conditions described, the pressure-measuring unit 11 is still further advanced toward the test specimen until the upper part of the pressure-bar 14, terminating at the rounded end 21' (see Figs. 1, 9 and 13), approaches and contacts with the resistor-spring 22. Instantly, as this contact is made (as in Figs. 1, 2 and 13), both the pressure-indicator hand 32 and the depth-gage indicator-hands 36' and 36'' move simultaneously (see Figs. 1 and 9), the latter showing units of depth of penetration and the former showing the amount of test pressure or stress required to cause such penetration. For standard hardness measurement, a predetermined depth of penetration is desirable. Hence, in all test specimens, the depth readings are required to show such a predetermined value; in other words, it becomes a constant factor, leaving the pressure-gage to show the variable factor, or, in other terms, the hardness value or resistance to penetration thereof in the specimen.

In the operation of my improved hardness measuring-machine, it is not limited to the manner described, but it may be operated in a reverse manner; that is, a constant pressure may in some instances be desirable, so that the variable readings are taken from the depth-gage. This method is particularly desirable in detecting the flow point in soft metals. In either instance the hardness readings are taken with the load still on the test specimen.

In the measurement of hard metals, in which it is desirable to register constant-depth values with the micrometer-gage 36, this constant depth feature would ordinarily be impracticable because of the inevitable shortening by contraction of a reduced penetrator point such as described, which may be either a hardened steel ball or a jewel, such as a diamond; that is, the micrometer-gage could not distinguish between actual penetration and the simultaneous elastic contraction of the impresser-point. To eliminate this deception, I incorporate the compensating reversing lever feature described.

It has been noted, that while the pressure-bar 14, in the preferred embodiment of my invention, carries a micrometer-gage 36, it is not rigidly fastened to the said bar; that is, its mount is mechanically sensitive, it is subject to microscopic movement longitud'nally thereto and in a direction opposite to that of pressure application, or, in other words, away from the test specimen which is being penetrated. The operation of this feature depends upon either the tilting of an off-set arm or lever d'rect, as indicated at 41 (see Figs. 1 to 9, inclusive), or a means 84, such as a lever, indirectly, as indicated in Figs. 13 to 17, inclusive, in which latter instance the retractile motion of the micrometer is parallel to the pressure-bar unit, as per Fig. 13. At any rate, whatever fractional or total retractile movement is imparted to the micrometer, depending upon the amount of pressure applied to the test specimen, the said retractile movement is always equal to the elastic shorten'ng of the before-mentioned reduced impresser - point. This, then results in a neutralization of the error that would otherwise be introduced. In other terms, for each unit of contraction in the impresser-point, the micrometer recedes a similar unit, permitting the said micrometer to indicate without interference only the true and actual depth penetrated by the impressor member 45 into the test specimen even though of the most intense hardness. By aid of this feature, the penetrated depth-increment units, as indicated on the gage, may be plotted on a stress-strain chart against the series of pressure units required, so that curves showing a qualitative and quantitative hardness may be faithfully generated. The said vital mechanism is a complete and independent operatable assembly and may be used with equal facility when detached from its press-frame or support and mounted, for example, in a drill-press chuck, etc.

The pressure-bar with its improved micrometer depth-measuring system, its contacting and clamping-sleeve, carrying the adjustable micrometer-actuator element, form a complete depth measuring unit and may be operated in turn independently of the pressure mechanism shown, so that the test specimen may be placed upon a weighing-scale and which would then indicate the pressure required to cause a given depth of penetration in the test specimen. To adapt the pressure bar to function without the compensating or corrective means for the micrometer, this means may be dispensed with through the medium of the set-screw 73. (Figs. 1 and 3 to 6) as in the working of very soft metals, or making only comparative and non-recheckable tests in all metals. For recheckable tests, however, which are always capital in the measurement of hardness, the compensator means is desirable and necessary. There are many ways of introducing the mechanical contractile feature, which, through suitable reversing means, serves to move the micrometer away from false depth registration. The said movement of the micrometer, however, always is taken from an approximately similar amount of movement, that is, mechanical shortening of the upper part of the pressure-bar. The preferred and most reliable forms, however, are of the character described in the foregoing.

In routine testing, it is essential that the setting to zero of the depth-gage through the means provided and described, be eliminated. Inasmuch as this would ordinarily take too much time and patience on the part of the operator, in its stead, the twin-pointer hand 36" (Figs. 1 and 9) is used, and which is operative on any part of the graduated dial or fractional part of the divisions thereon. The method employed, is to bring the pressure and depth-measuring elements, respectively, in contact with the test specimen, so as to bring the depth-gage to its before mentioned responsive resting position. During this interval and up to actual contact with the pressure-scale, as previously described, by a single movement of the pressure-wheel 4, there is ample time for the operator to fix his eye upon and to note the position of the forward member of the twin-hands. When penetration begins and the twin-hands move forward together indicating this, the machine being operated until the back member thereof is moved to the precise spot where the forward member first rested. This will enable the operator to space off any predetermined number of depth divisions, without attempting to set the depth-gage to zero by manual means, and thus very materially speed up the rate of operation of the machine in its entirety.

Although the twin-hand indicator above described and as shown in the drawings is a one piece structure, it is obvious that the members of said indicator may be attached or fastened in the proper manner as individual elements. It is understood also that I do not limit myself to the number of elements of which the multiple hand indicator may be composed.

It is further understood that while the drawings show and the specification describe, one embodiment of my invention, that I am not limited, directly or indirectly, to what is shown in the drawings, or to what has been described in said specification. In other words, the purpose of the drawings and specifications is merely to make clear to those skilled in the art to which my invention relates, one complete operative embodiment and one alternative element thereof, based upon the broad principles, all within the letter as well as the spirit of the description and within the scope of the appended claims.

I claim:

1. In apparatus for measuring the hardness of material, a frame arranged with a support for the material the hardness of which is to be measured, a casing carrying a pressure indicating gauge carried by the frame to have movement toward and away from the material support, said casing having a tubular neck portion extending in opposed relation to the material support, a sleeve member slidably mounted in the casing neck, a spring normally urging the sleeve member outwardly from the casing neck, a bar slidably mounted in and extended from the sleeve member, said bar having a socket in one end and a bore extended into the opposite end adjacent to the socket, a member mounted in said socket to engage the material on the material support, an auxiliary bar mounted in the bore of the first bar, a contractile member in the bore of the one bar interposed between the ends of the bore and auxiliary bar, said auxiliary bar adapted to receive pressure and transmit the same through the contractile member and the first bar to the member carried in the socket in the end of the first bar, pressure applying means operative to move the casing with its associated parts toward and away from the material support of the frame, and means to transmit the force of the pressure of said means through the auxiliary bar to the first bar and actuate the pressure indicating gauge to indicate the pressure applied to said bar.

2. In apparatus for measuring the hardness of material, a frame arranged with a support for the material the hardness of which is to be measured, a head carried by the frame to have movement toward and away from the material support and having a tubular neck in opposed relation to the support, a sleeve slidably mounted in the neck of the head, a spring interposed between the sleeve and neck yieldingly urging the sleeve outwardly from the neck, a bar slidably mounted in and extended from the sleeve and having a socket in the end adjacent the material support and a bore extended into the opposite end adjacent to the socket, an impressor member mounted in the socket, an auxiliary bar slidably mounted in and extended from the bore of the first bar, a contractile member in the bore of the one bar interposed between the ends of the bore and auxiliary bar, means to forcibly move the bar assembly toward the material support, means carried by the head to apply the pressure of said force to the auxiliary bar and said bar adapted to transmit the same through the contractile member and impressor member carrying bar to the impressor member, means carried by the sleeve arranged for the passage of the impressor member and adapted to engage the material on the material support and allow the bar assembly to have movement relative to the sleeve, a depth indicating gauge, a lever pivotally mounted on the bar assembly having a part yieldingly contacting with the auxiliary bar contacting end of the contractile member, and a gauge actuator carried by the sleeve and operative by the movement of the bar relative to the sleeve to actuate the gauge proportionally with the penetration of the impressor member in the material.

3. Apparatus for measuring the hardness of material as claimed in claim 2, wherein the bore in the one bar is arranged with an annular enlarged portion with an opening extended therefrom through the side wall of the bore, a bracket fixed to the bar having the bore and upon which the lever is pivoted, one arm of the lever extending laterally and carrying the gauge and the other arm extended through the opening into the annular enlargement of the bar bore, bearing members connected with said latter lever arm to extend in the plane of and at opposite sides of the auxiliary bar and having knife edges to contact with the auxiliary bar contacting end of the contractile member, and a spring to urge the gauge carrying lever in a direction to engage and maintain the knife edge of the bearing members in contact with the contractile member whereby the gauge is adapted to be adjusted away from the gauge actuator distances corresponding with the contraction of the contractile member.

4. Apparatus as claimed in claim 2, wherein the bar bore is provided with an annular enlargement with an opening cut through the wall of the bore and the end of the auxiliary bar contacting with the contractile member is reduced in diameter, and the lever pivoted on the bar with one arm extended laterally from the bar and carrying the gauge and the other arm extending into the enlargement of the bar bore, bearing members fixed to said latter arm of the lever to extend parallelly of and at opposite sides of the reduced end of the auxiliary bar and having knife edges to engage the contractile member, and a spring to yieldingly urge the lever with the bearing knife edges into contact with the contractile member whereby the gauge is adapted to be adjusted away from the gauge actuator distances corresponding with the contraction of the contractile member.

5. In apparatus for measuring the hardness of material, a bar carrying an impressor member at one end and a bore extended into the opposite end and having an annular knife edge extended inward from the end of and spaced from the side wall of the bore, an auxiliary pressure receiving bar engaged in the bore of the first bar, a disk of resilient material supported within the marginal portion thereof upon the knife edge extended inward from the end wall of the bore in the one bar and the auxiliary bar engaging centrally of the disk and adapted to transmit the pressure applied thereto through said disk and the first bar to the impressor member, and a sleeve confined within the bar bore and surrounding the auxiliary bar and engaging the peripheral portion of the disk for the purpose specified.

6. In hardness measuring apparatus, the combination of a press frame arranged with a support for the material the hardness of which is to be measured and having means for applying pressure including a gear train for multiplying the power applied to said means and means to rotate the gear train adapted to be adjusted angularly to different operative positions, a pressure gage associated with the press frame, said gage having adjustable weigher spring means, a pressure bar slidable in said gage and movable relative thereto when actuated by said spring means, said pressure bar comprising telescopic inner and outer portions, an impressor point removably carried at the lower end of said pressure bar, a yielding member interposed between the telescopical portions of the pressure bar, said member being responsive to variations of pressure exerted upon said pressure bar, a lever pivoted on one of said portions of the pressure bar and having one arm in contact with the yielding member, a depth gage carried by the other arm of said lever, and means for actuating said gage, including an adjustable member to contact with the material on the material support of the press frame.

ALBERT F. SHORE.